United States Patent [19]

Yie

[11] Patent Number: 5,241,986
[45] Date of Patent: Sep. 7, 1993

[54] CHECK VALVE ASSEMBLY FOR HIGH-PRESSURE APPLICATIONS

[76] Inventor: Gene G. Yie, 29244 59th Ave. South, Auburn, Wash. 98002

[21] Appl. No.: 871,895

[22] Filed: Apr. 21, 1992

Related U.S. Application Data

[63] Continuation-in-part of Ser. No. 794,581, Nov. 19, 1991, Pat. No. 5,186,393, which is a continuation-in-part of Ser. No. 630,560, Dec. 20, 1990, Pat. No. 5,092,362.

[51] Int. Cl.$^5$ .................. F16K 17/04; F16K 15/00; F16K 1/36
[52] U.S. Cl. .................. 137/512; 137/512.5; 137/538; 137/543.23; 251/63.4; 417/571
[58] Field of Search ............ 137/512, 512.5, 538, 137/543.23; 251/63.4; 417/571

[56] References Cited

U.S. PATENT DOCUMENTS

| | | | |
|---|---|---|---|
| 2,219,290 | 10/1940 | Bijur | 137/543.23 X |
| 2,822,817 | 2/1958 | Benzel | 137/543.23 X |
| 3,234,959 | 2/1966 | Feinberg | 137/543.23 X |
| 3,439,705 | 4/1969 | Simko | 137/543.23 |
| 3,565,100 | 2/1971 | Pfleger | 137/543.23 X |
| 3,943,969 | 3/1976 | Rubin et al. | 137/543.23 X |
| 4,005,733 | 2/1977 | Riddel | 251/129.16 X |
| 4,176,680 | 12/1979 | De Launay | 137/538 X |
| 4,313,570 | 2/1982 | Olsen | 239/583 |
| 4,371,001 | 2/1983 | Olsen . | |
| 4,412,792 | 11/1983 | LaBorde et al. . | |
| 4,716,924 | 1/1988 | Pacht . | |
| 4,862,911 | 9/1989 | Yie . | |
| 4,953,589 | 9/1990 | Nakamura | 137/543.23 |

*Primary Examiner*—Gerald A. Michalsky
*Attorney, Agent, or Firm*—Speckman, Pauley & Fejer

[57] ABSTRACT

A check valve having a valve housing with an outlet fluid passage and a housing valve cavity in communication with each other. A valve body has an inlet fluid passage and a body cavity in communication with each other. The valve body is sealably secured to the valve housing. A valve poppet is slidably mounted within the body cavity. The valve poppet has a central cavity. A side wall of the valve poppet has a poppet through hole which is in communication with the central cavity. The valve poppet has a poppet shoulder portion and an extension portion. A seal disk has a seal disk through hole into which the extension portion of the valve poppet is positioned. The seal disk is positioned within the housing valve cavity. A closure spring is used to normally urge the valve poppet into a closed position in which the valve poppet preferably abuts a sealing surface of the valve body.

20 Claims, 10 Drawing Sheets

CHECK VALVE ASSEMBLY FOR HIGH-PRESSURE APPLICATIONS

CROSS REFERENCE TO RELATED APPLICATIONS

This application is a continuation-in-part of co-pending U.S. patent application Ser. No. 07/794,581, filed Nov. 19, 1991, now U.S. Pat. No. 5,186,393; which is a continuation-in-part of co-pending U.S. patent application Ser. No. 07/630,560, filed Dec. 20, 1990, now U.S. Pat. No. 5,092,362.

BACKGROUND OF THE INVENTION

1. Field of the Invention

This invention relates to a check valve assembly for controlling the flow of gases or liquids at high pressures, which is particularly well suited for use in high-pressure reciprocating pumps and pressure intensifiers at pressures in excess of 10,000 psi. The check valve assembly is also well suited for handling two-phase fluids, such as slurries, that cause problems with conventional check valves.

2. Description of Prior Art

Check valve assemblies are critical components in high-pressure pumps and pressure intensifiers, because they control the flow of fluid into and out of a pressure chamber which houses the reciprocating plunger. The sealing capability and the reliability of check valves are extremely important factors in the operation of high-pressure pumps, since fluid flow distribution results in disruption of the pump operation. When fluid leakage occurs at the check valve, the pump cannot operate at its designed pressure. Any major failure of the check valve renders a pump useless. A good example is the type of check valve that controls the blood flow in a human heart; failure of the heart valve often results in death.

Today, reciprocating pumps can pressurize working fluids to levels substantially greater than 10,000 psi, at relatively high flow rates. Conventional pressure intensifiers can pressurize a variety of fluids to pressures exceeding 50,000 psi. Such conventional pumps and pressure intensifiers operate at high reciprocating rates and the check valves are therefore subject to tremendously high cyclic stresses. As a result, conventional check valves often fail. Various attempts have been made to improve the design and performance of high-pressure check valves. Unfortunately, further improvements are still necessary.

U.S. Pat. No. 4,412,792 teaches a check valve assembly for use in a hydraulically-driven, double-acting fluid pressure intensifier. The check valve assembly has an inlet check valve and an outlet check valve positioned in a cylindrical valve body that also acts as an end plug for the pressure chamber. The inlet check valve has a machined plate with a smooth mating or sealing surface positioned against the inner surface of the check valve body. The check plate is retained by one or more threaded screws or hollow studs anchored into the check valve body. A spring is used to exert force on the check plate against the check valve body. Thus, the smooth metal-to-metal sealing surface provides fluidic sealing in the inlet check valve assembly. The outlet check valve assembly taught by U.S. Pat. No. 4,412,792 includes a metal or other hard ball or coned poppet which is seated against a tapered mating surface machined in the check valve body, and a backup spacer, or so-called "movable member", instead of a commonly used spring. Such conventional check valve assembly design has several shortcomings. One is the polished metal-to-metal surface sealing that is expensive to achieve due tot he required lapping and is known to have metal fatigue problems with respect tot he check plate, particularly along the edges. A second shortcoming involves the screws and threaded studs that vibrate loose in a pressure-pulsation environment. A loose screw inside the pressure chamber of a pump can result in a disaster. A third shortcoming is the machined check surface of the outlet check valve; such surface is difficult to machine since it is recessed deep inside the check valve body and is difficult to repair. Ball-based check valves are known to have valve seat wear problems due to the thin contact surface between the ball and the coned valve seat. Even slight erosion quickly destroys the entire valve seat. In fact, the valve seat must be made of material softer than the ball in order to obtain a better sealing surface. However, with such arrangement, the useful life of the valve seat can still be a problem due to fluid erosion during valve operation.

U.S. Pat. No. 4,371,001 discloses another check valve assembly that differs slightly from the check valve assembly taught by U.S. Pat. No. 4,412,792, with respect to the components involved. Instead of using a check plate, U.S. Pat. No. 4,371,001 teaches the use of a "valve element" as the inlet check valve and another "valve element" as the outlet check valve. Both "valve elements" are basically flat-surface valve poppets that seat against smooth sealing surfaces. The inlet check valve poppet is retained by a screw, has a plate spring to provide an initial sealing force, and is seated against a smooth inner surface of the check valve body, which also serves as an end plug for a pressure chamber of a fluid pressure intensifier. U.S. Pat. No. 4,371,001 also discloses a removable seating element, shaped as a metal disk having a smooth sealing surface, a cylindrical valve poppet having a smooth sealing surface, and a compression spring used to exert an initial sealing force on the outlet check valve poppet. The outlet check valve seat or disk is retained inside the check valve body with a threaded outlet housing. This particular check valve shares the same shortcomings discussed previously, namely the problems associated with lapped surfaces, a threaded stud positioned inside the pressure chamber, and metal-to-metal fatigue problems. Further, the use of a plate or leaf spring is another shortcoming due to the very limited travel distance and a peculiar pivoting motion that such plate spring provides to the inlet check valve poppet. As a result, the inlet check valve poppet is prone to premature edge failure and the sealing surface of the check valve body can be gouged by the valve poppet. The outlet check valve assembly taught by U.S. Pat. No. 4,371,001 also has a very limited fluid passage.

U.S. Pat. No. 4,716,924 teaches a replaceable discharge valve assembly for a high-pressure reciprocating plunger pump having a generally tubular valve seat designed to mate with a reciprocating valve closure member. One set of such valve assemblies serves as the in inlet check valve for the pressure chamber while another set of such valve assemblies serves as the outlet check valve for the same pressure chamber that houses a reciprocating pump plunger. A cylindrical valve poppet having guide ribs and a tapered sealing surface is used to engage the sealing surface of the tubular valve seat. The inlet and outlet check valves are designed similarly but differ in size and are positioned in separate cylindrical bores within a steel block. Such check valve assemblies are quite commonly used in conventional crankshaft plunger pumps, all having hardened steel valve poppets and valve seats with tapered, smooth mating surfaces. Some conventional pumps are very large and have relatively large valve poppets that produce significant pounding forces when the valve poppet closes against the valve seat. Furthermore, the valve sealing surface is also exposed to high-velocity fluid flow whenever the valve poppet opens. As a result, the valve mating surfaces wear out rapidly and thus require frequent replacement of both the valve poppet and the valve seat.

U.S. Pat. No. 4,862,911 teaches a check valve assembly that combines inlet and outlet check valves in a single valve body that can be housed inside a high-pressure cylinder that acts as a pressure chamber of a pump or pressure intensifier. A threaded hollow stud serves as a retainer for both inlet and outlet check valves. The valve elements comprise balls, flat disks, or coned poppets. The basic sealing surfaces form metal-to-metal seals, and thus have all of the inherent problems, such as a requirement for precision machining, lapping, or both, metal fatigue problems, metal deformation problems, metal erosion problems, and inherently poor fluidic seals resulting from metal-to-metal surface contact.

This invention solves such problems associated with conventional check valve assemblies without sacrificing pressure and flow capabilities or convenience during use.

SUMMARY OF THE INVENTION

It is an objective of this invention to provide a general-purpose check valve assembly capable of controlling the flow of various fluids at a wide range of pressures, up to very high pressures, and at a wide range of flowrates with improved reliability.

It is another objective of this invention to provide a check valve that is particularly advantageous when used with a reciprocating pump to control the direction of fluid flow, both into and out of a pressure chamber.

It is a further objective of this invention to provide a check valve that is particularly advantageous when used to handle multiple-phase fluids, such as liquids that contain particulates.

It is still a further objective of this invention to provide a combination of inlet and outlet check valves particularly suited for use in reciprocating pumps, to handle fluids at very high pressures and very high flowrates.

It is yet another objective of this invention to provide a valve poppet that can be advantageously used in general purpose on-off valves to handle fluids that contain particulates.

It is still a further objective of this invention to provide a high-pressure instant on-off valve having a valve poppet assembly which minimizes metal stresses and fatigue and provides improved fluidic sealing.

The above objects of this invention are accomplished, according to one preferred embodiment of this invention, with a check valve that includes a valve housing that defines an outlet fluid passage and a housing valve cavity. The housing fluid passage is in communication with the housing valve cavity. A valve body has an inlet fluid passage and a body cavity which are in communication with each other. The valve body is sealably secured to the valve housing.

A valve poppet is slidably mounted within the body cavity. The valve poppet has a central cavity and a side wall of the valve poppet has a poppet through hole in communication with the central cavity. The valve poppet has a poppet shoulder and an end portion.

A seal disk with a seal disk through hole is positioned within the housing valve cavity. The seal disk preferably abuts the poppet shoulder. The end portion of the valve poppet is positioned within the seal disk through hole.

Springs are preferably used to normally urge the valve poppet into a closed position of the check valve. In such closed position, the valve poppet abuts a sealing surface of the valve body.

This invention can also be used advantageously as an instant on-off valve by changing the shape of the valve poppet, positioning the valve poppet inside a valve body, and using a suitable pneumatic or hydraulic valve actuator to provide the necessary power to move the valve poppet. An elongated valve stem can be attached to an end of valve poppet which is opposite to the end of the valve poppet that has fluid passages. The opposite end of the elongated valve stem is connected to the piston rod of the valve actuator. Operating the valve actuator provides the necessary force to move the valve poppet to open and close the fluid outlet of the valve cavity. It is well known that an instant on-off valve for high-pressure fluid operations is extremely difficult to construct due to the precise sealing requirements and high fluid-induced stresses involved. A high-pressure instant on-off valve capable of handling fluids containing particulates is even more difficult to construct due to the extremely difficult task of achieving fluid sealing requirements. Commonly employed metal-to-metal seals comprising balls, flat disks, coned disks, and coned plungers are known to have relatively poor reliability. Conventional softer seals for creating fluidic seals are not acceptable alternatives at extreme fluid pressures. The instant on-off valves according to preferred embodiments of this invention will overcome the difficulties associated with constructing a high-pressure instant on-off valve capable of maintaining the necessary fluidic seals since there are no metal-to-metal seals.

DESCRIPTION OF PREFERRED EMBODIMENTS

Figure 1:
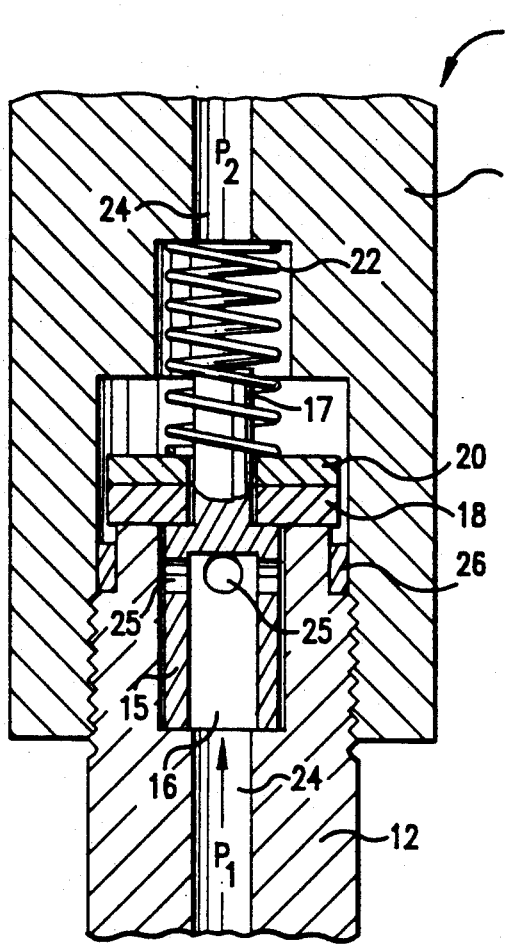
FIG. 1 is a partial cross-sectional view of a check valve assembly according to one preferred embodiment of this invention, in a closed position showing a check valve poppet seated within a cylindrical cavity of a check valve body by the action of a valve closure spring with or without fluid force produced by a pressure differential ($P_2$ being greater than $P_1$), and the fluid passage blocked by a seal disk backed by a backup disk.

Referring to one preferred embodiment of this invention as shown in FIG. 1, check valve assembly 10 employs valve poppet 15 which is aided by seal disk 18, backup disk 20 and closure spring 22 to open and close fluid passage 24. In FIG. 1, fluid preferably enters check valve assembly 10 in a direction from $P_1$ to $P_2$, as shown by the inlet and outlet arrows. When the downstream fluid pressure $P_2$ is greater than or equal to the upstream pressure $P_1$, check valve assembly 10 is closed, as shown in FIG. 1. Valve poppet 15 according to this invention is preferably cylindrical, having a central cavity 16 and fluid outlet hole 25 or holes 25, or other fluid-passage arrangements shown in the drawings and discussed later in this specification, and a preferably round, relatively small extension portion 17 for engaging seal disk 18. It is apparent that extension portion 17 can have other suitable shapes. Valve poppet 15 is positioned within a cylindrical cavity within valve body 12 and is free to slide up and down since there is a close tolerance between valve poppet 15 and valve body 12. In one preferred embodiment according to this invention, the depth of this cylindrical cavity is exactly the same as the length of valve poppet 15 without extension portion 17. Therefore, when valve poppet 15 is positioned within the cylindrical cavity of valve body 12, its upper shoulder is flush with the upper surface of valve body 12. This upper surface of valve body 12 is preferably very smooth. Valve body 12, valve housing 11 and valve poppet 15 are all preferably constructed of hardened steel. Seal disk 18 is positioned on valve poppet 15. Seal disk 18 has a central through hole to accommodate the preferably rounded extension portion 17 of valve poppet 15. Backup disk 20 is positioned on seal disk 18 and has a central through hole, also to accommodate the preferably rounded extension portion 17 of valve poppet 15.

FIG. 1 shows closure spring 22 positioned on top of backup disk 20 and around extension portion 17 of valve poppet 15 for providing an initial closure force. It is apparent that other spring arrangements or bias means can be used to accomplish the same result of providing an initial closure force. Valve body 12 engages valve housing 11 by a threaded connection or any other suitable connection means and forms a fluid-tight cavity with seal 26, or any other suitable sealing means, to house all check valve elements as shown in FIG. 1. When downstream fluid pressure $P_2$ is greater than upstream fluid pressure $P_1$, the fluid exerts force on valve poppet 15 and seal disk 18 to push valve poppet 15 down into the cylindrical cavity of valve body 12. Seal disk 18, which is preferably made of relatively soft but durable materials, such as plastics, polymers, soft metals or a combination of such materials, abuts the face of valve body 12 under fluid-induced force and spring action and forms a fluid tight seal, particularly around the annular gap between valve poppet 15 and the surface of valve body 12 which defines the cylindrical cavity. Under fluid pressure, seal disk 18 is well supported by the sealing face of valve body 12 and the shoulder of valve poppet 15. Thus, there is little or no bending stresses or other detrimental stresses acting on seal disk 18, backup disk 20, or valve poppet 15. Valve poppet 15 is well supported at its bottom surface, as shown in FIG. 1, by valve body 12.

Figure 2:
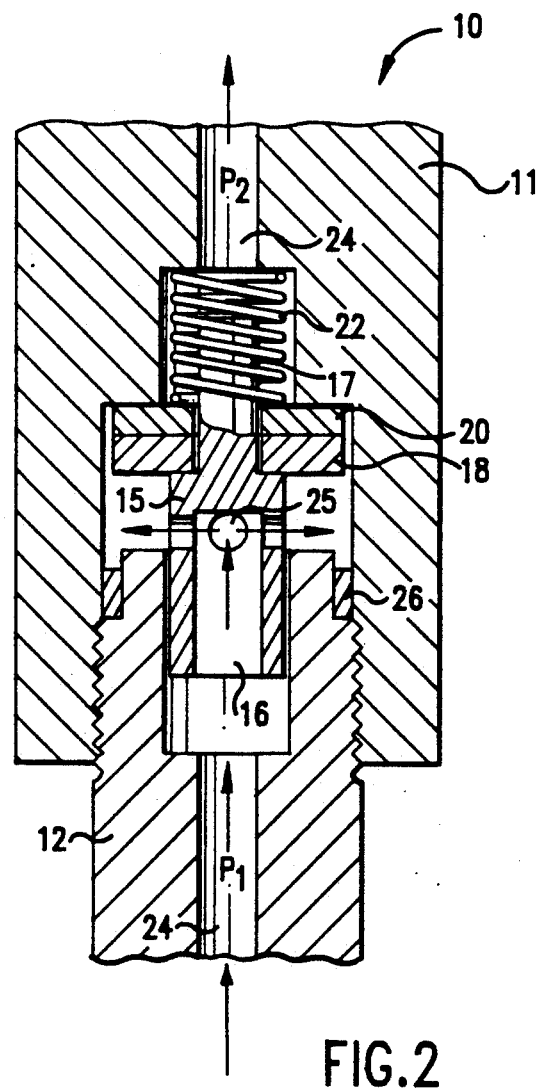
FIG. 2 is a partial cross-sectional view of the check valve assembly shown in FIG. 1, but in an open position showing the check valve poppet forced downstream by fluid entering the valve body below the valve poppet, thus allowing fluid to flow through the check valve poppet and the check valve cavity and out of the check valve housing, at the top.
Figure 3:
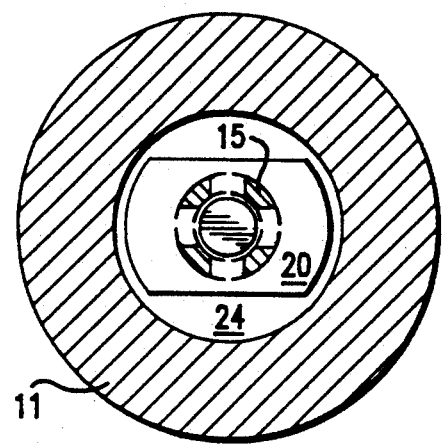
FIG. 3 is a top view of the seal disk and the backup disk according to one preferred embodiment of this invention, showing fluid passages through the check valve poppet and around the seal disk and the backup disk.

Referring to FIG. 2, valve poppet 15 rises upward against closure spring 22 when upstream fluid pressure $P_1$ is greater than downstream fluid pressure $P_2$. As a result, each fluid outlet hole 25 of valve poppet 15 is in communication with the valve cavity. Fluid is then free to flow in a downstream direction through check valve assembly 10. The compatible shapes of the planar surface of seal disk 18 and backup disk 20 are not completely circular since there are sections cut away at their sides for fluid to flow, as shown in FIG. 3. The shape of the entire valve cavity is also designed to allow ample fluid flow and to house the valve components.

Figure 4:
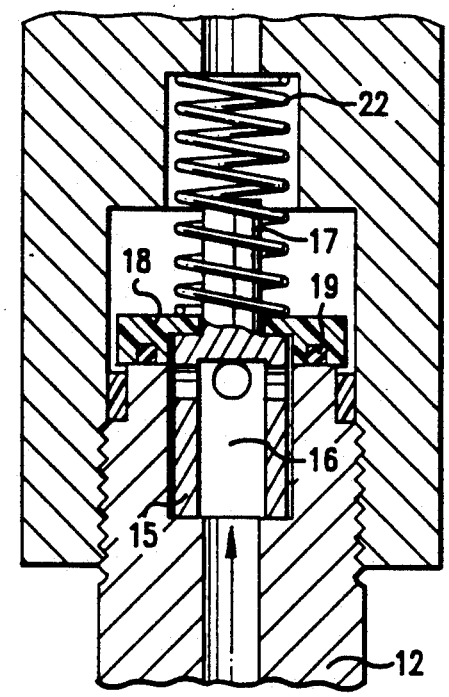
FIG. 4 is a partial cross-sectional view of a seal disk arrangement according to another preferred embodiment of this invention, showing the absence of a seal backup disk and a seal gasket installed in a groove within the sealing surface of the seal disk or of the check valve body, and showing another preferred embodiment of a cylindrical valve poppet in which the valve poppet protrudes out of the poppet cavity of the check valve body.

In certain preferred embodiments of this invention, it is advantageous to use multiple or composite materials for constructing seal disk 18, so as to accommodate a wide range of fluid pressure and to seal against particulates. An example of such cases is handling liquid-particulate slurries at high pressures. In such cases, it is advantageous to incorporate seal gasket 19 in seal disk 18, as shown in FIG. 4. Seal gasket 19 is preferably installed in a circular groove within the sealing face of seal disk 18. Seal disk 18 is preferably constructed of relatively hard material or composite materials, such as plastics, soft metals, and the like, while seal gasket 19 is preferably constructed of polymers, plastics, rubbers and the like. Valve body 12 is preferably constructed of hard steel. By virtue of this arrangement, check valve assembly 10 according to this invention can function at relatively low fluid pressures as well as at relatively high fluid pressures. It is apparent that according to another preferred embodiment of this invention, a groove is constructed within the sealing surface of valve body 12 and seal gasket 19 is installed within valve body 12 in addition to or in lieu of within seal disk 18. If seal disk 18 is constructed of relatively hard materials, then backup disk 20 may be eliminated and closure spring 22 will directly abut seal disk 18.

As previously discussed, valve poppet 15 of this invention preferably has a shoulder that is flush with the sealing surface of valve body 12 when check valve assembly 10 is completely closed, as shown in FIG. 1. However, it is not necessary to have such arrangement if seal disk 18 is shaped to accommodate valve poppet 15 as shown in FIG. 4. In this preferred embodiment, seal disk 18 has a counterbore to accommodate valve poppet 15 such that seal disk 18 can still seal the annular gap around valve poppet 15. The fluid passage of valve poppet 15 must be positioned below the sealing surface of valve body 12 when check valve assembly 10 is closed. Otherwise, seal disk 18 can be extruded into the cavity of valve poppet 15 by adequate fluid pressure.

Figure 5A:
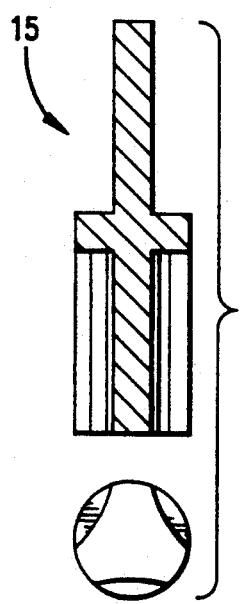
FIGS. 5A, 5B and 5C show cross-sectional views of the various cylindrical valve poppets, according to various embodiments of this invention, having the shape of a cylindrical shoulder and a sliding guide, a cylindrical seal disk retainer at one end and a fluid passage of various geometries at the other end; the fluid passage terminates prior to the poppet shoulder and thus provides a seal support and a means for valve closure.
Figure 5B:
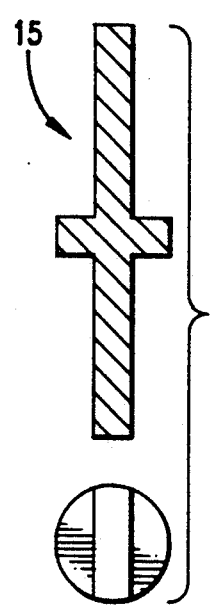
Figure 5C:
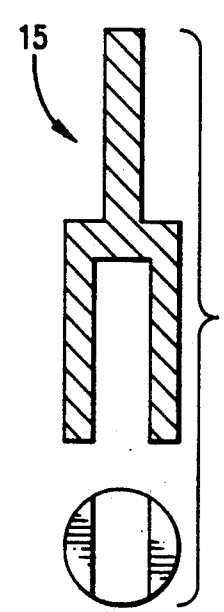

Valve poppet 15 of this invention can have various forms as long as it has a fluid passage, can slide freely in a suitably shaped cavity of valve body 12, and can be supported at its end by valve body 12. Valve poppet 15 must be able to accommodate a seal element conveniently, and directly or indirectly engage closure spring 22 or another suitable bias means. Other preferred embodiments of valve poppet 15 according to this invention are shown in FIGS. 5A, 5B and 5C. All three valve poppets 15 are cylindrical in shape and have a slot or a section cut away for fluid to flow, and a shoulder for accommodating and supporting the seal elements.

Figure 6:
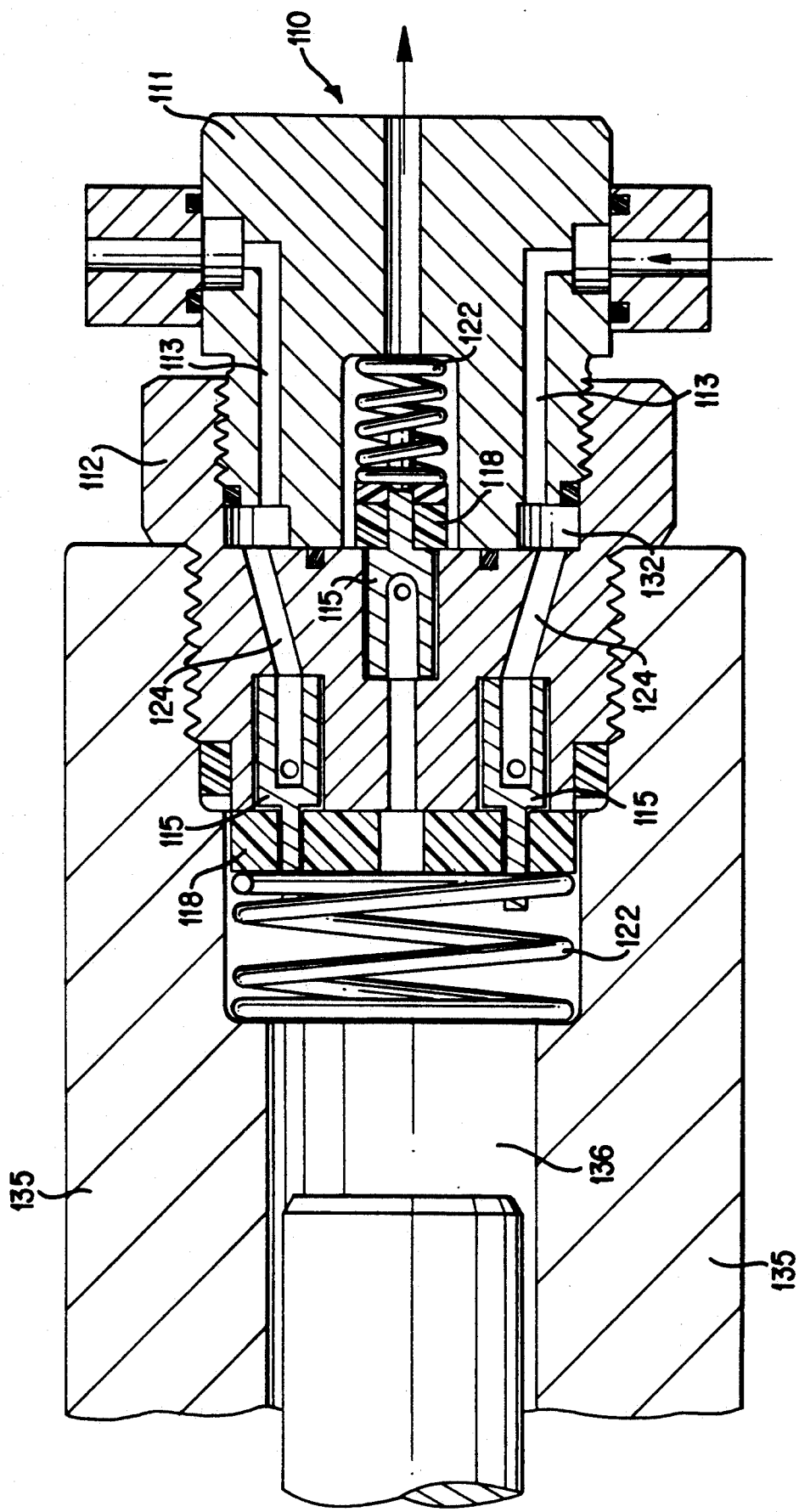
FIG. 6 is a partial cross-sectional view of a combination of inlet and outlet check valve assemblies, according to another preferred embodiment of this invention, particularly suited for use in reciprocating pumps and fluid pressure intensifiers, showing the use of multiple inlet check valve poppets, a single inlet seal disk, a single inlet check valve closure spring, a single outlet check valve poppet assembly, a threaded check valve body, and a threaded-in outlet adapter; the reciprocating motion of the pump plunger causes the inlet check valve poppets and outlet check valve poppet to alternatively open and close so as to raise the pressure of the fluid that enters the pump chamber.

Referring to FIG. 6, which shows an advantageous use of check valve assembly 110 of this invention mounted in equipment body 135, such as a reciprocating pump, one or more valve poppet assemblies of this invention are incorporated into a single check valve assembly 110 to function as both inlet and outlet check valves. In this preferred embodiment, a cylindrical check valve body 112 is mounted with threads, bolts, or other suitable mounting means into an outlet end of equipment body 135, such as a high-pressure cylinder of a pump. Equipment body 135 forms equipment cavity 136 within which seal disk 118 and closure spring 122 are mounted. Check valve body 112 preferably has a flat, smooth internal sealing surface to engage seal disk 118, which is baked up by closure spring 122 to exert a constant force, preferably of relatively low magnitude, so that seal disk 118 maintains contact with check valve body 112.

One or more valve poppets 115 of this invention are installed in cylindrical cavities of check valve body 112 to serve as inlet check valves. Another valve poppet 115 of this invention is installed inside a central cavity of check valve body 112 to serve as an outlet check valve. Fluid passages allow both low-pressure and high-pressure fluid to pass through valve poppets 115. Valve housing 111 serves multiple purposes, such as housing seal elements and closure spring 122 of outlet check valve poppet 115, and providing fluid passages.

As shown in FIG. 6, valve housing 111 is connected to check valve body 112 by threads, bolts, or indirect compression means to form fluid-tight cavities, with seals if necessary. Low-pressure fluid enters the pump chamber through one or more peripheral inlet passages 113 around valve housing 111 into annular space 132 around the internal end of valve housing 111. From annular space 132, the low-pressure fluid enters one or more cylindrical cavities that house inlet valve poppets 115, thus exerting force against inlet valve poppets 115. During the charging stroke, the equipment cavity 136, or the pump chamber, empties and the pump plunger retracts. The force exerted on each inlet valve poppet 115 by the low-pressure fluid is strong enough to overcome the force exerted on seal disk 118 by inlet check valve closure spring 122 such that all inlet valve poppets 115 are pushed from right to left, as shown in FIG. 6, to compress closure spring 122 and to open the fluid passage of each inlet valve poppet 115, thus allowing the fluid to fill the pump chamber. The inlet valve poppet or poppets 115 are preferably mounted around check valve body 112. There can be many inlet valve poppets 115 arranged in a circumferential pattern, for example; their size is strictly a function of the flow requirements of the pump and dimensions of check valve body 112.

Outlet check valve assembly 110 is preferably positioned centrally within valve housing 111 but it is apparent that other positions may be preferred in different embodiments according to this invention. During the power stroke of the pump, the pump plunger moves from left to right, as shown in FIG. 6, to compress the fluid inside the pump chamber. As soon as it occurs, inlet valve poppets 115 retract into their cavity and inlet seal disk 118 abuts the sealing surface of check valve body 112 thus sealing all inlet ports. At the same time, the pressurized fluid within the pump chamber flows through the central hole and pushes outlet valve poppet 115 from left to right, as shown in FIG. 6, thus compressing outlet closure spring 122 and opening the outlet fluid passage to allow pressurized fluid to flow out of check valve assembly 110. At the end of the power stroke of the pump, the fluid pressure within the pump chamber decreases and outlet valve poppet 115 quickly returns to its cavity in the center of check valve body 112 with assisting forces from outlet closure spring 122, thus blocking outlet fluid passage 124. The end of the power stroke of the pump begins the start of its charging stroke and thus repeats the check valve cycle.

This combination of inlet/outlet check valve assembly 110 according to this invention has many advantages. It is compact and simple. Both inlet and outlet poppet cavities are positioned within the high-pressure cylinder from pressure fluctuations within pumps, which are known to cause metal fatigue problems. Ample fluid passages can be incorporated into check valve assembly 10, 110 without sacrificing pressure capabilities. Sealing of the check valves involves no hard metal-to-metal contact, which is known to produce metal fatigue and failure. A wide range of materials can be selected for the construction of inlet and outlet seal disks 118 to meet different sealing requirements. According to this invention, seal disks 118 are required to only seal relatively narrow circular gaps over a short time during pump operation, such that material extrusion and permanent deformation can be controlled. Check valve assembly 10, 110 of this invention has very wide and very high pressure capabilities. Check valve assembly 10, 110 according to this invention is well suited for use in crankshaft pumps or hydraulic-driven pressure intensifiers. High cyclic operations can be applied to check valve assemblies of this invention without concerns about fluid erosion due to the favorable geometry of the fluid passages.

Figure 7:
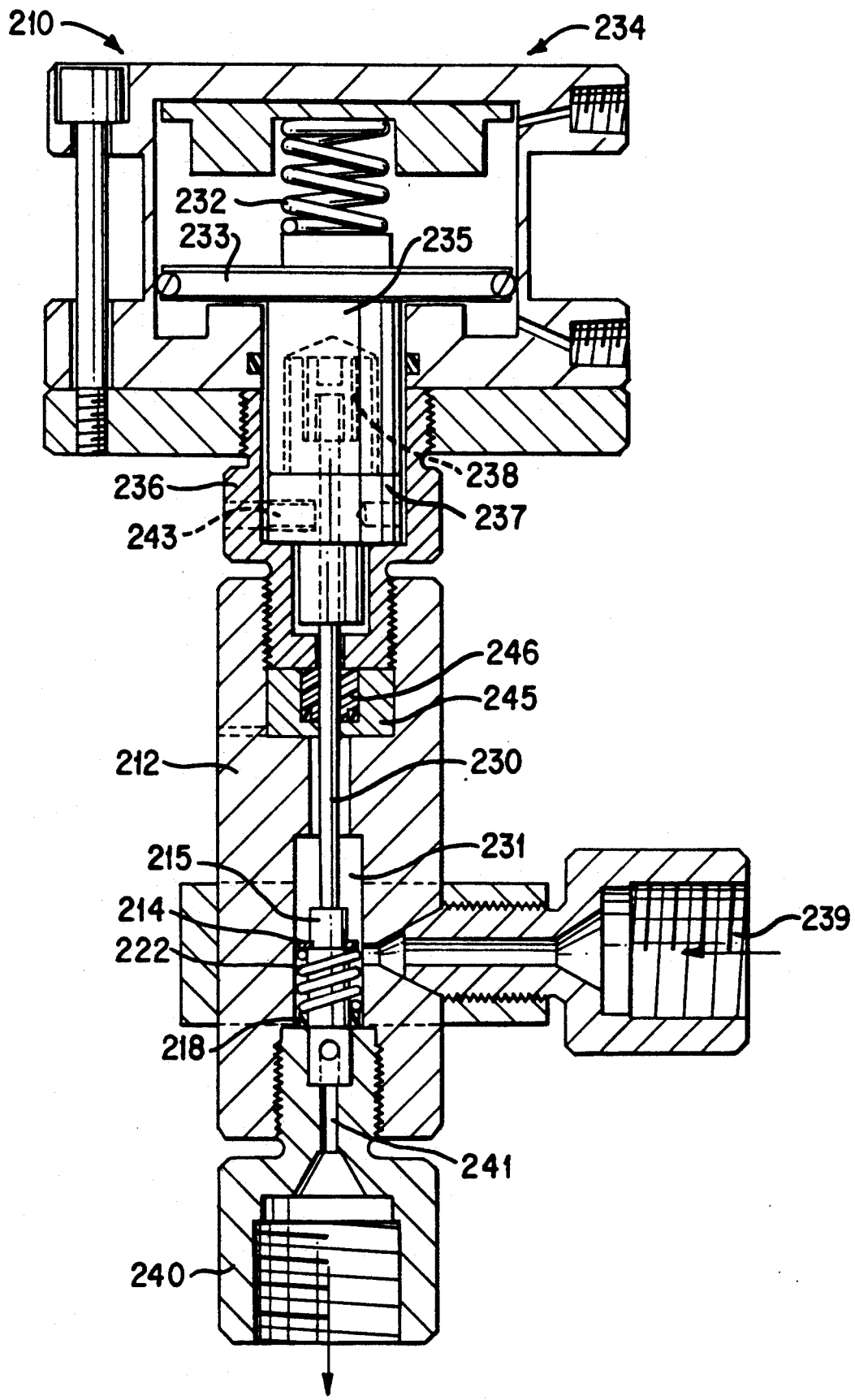
FIG. 7 is a partial cross-sectional view of a high-pressure instant on-off valve, according to another preferred embodiment of this invention, having a pneumatic or hydraulic valve actuator and an elongated valve poppet assembly, wherein the valve is shown in a closed position.

FIG. 7 shows another preferred embodiment of this invention which relates to high-pressure instant on-off valve 210 which is capable of handling fluids at very high pressures, fluids that contain particulates, or other difficult-to-handle fluids, particularly at high pressures. My co-pending U.S. patents applications having Ser. No. 07/794,581, filed Nov. 19, 1991, now U.S. Pat. No. 5,186,393, and Ser. No. 07/630,560, filed Dec. 20, 1990, now U.S. Pat. No. 5,092,363, which are incorporated into this patent application by reference thereto, describe many components of a fast-actuating on-off valve and pressure regulator, particularly well-suited for use with high-pressure incompressible fluids. Such fast-actuating on-off valves and pressure regulators have many components or elements similar to those shown in FIGS. 7-13 of this specification, as described below. It is apparent that regardless of any inconsistency between nomenclature, many of the elements taught in this specification can be interchanged with or substituted for those set forth in the specification, drawings, and/or claims of U.S. patent applications having Ser. Nos. 07/794,581 and 07/630,560, now U.S. Pat. No. 5,092,362.

Instant on-off valve 210 of this invention comprises a valve poppet assembly having elongated valve stem 230. An upper end of valve stem 230 is attached to piston rod 235 of pneumatic or hydraulic actuator 234. The valve poppet assembly is positioned within a cylindrical cavity of valve body 212. Valve body 212 is attached to actuator adapter 236 which is attached to the body of actuator 234. Outlet adapter 240 is secured to a discharge portion of valve body 212. It is apparent that the elements of this invention can be attached with respect to each other by threaded connections, as shown in the drawings, or by any other suitable connection means known to those skilled in the art.

Valve cavity 231 is preferably cylindrical, but can be any other suitable shape, and is sealed in a fluid-tight manner by seal cage 245 at one end of valve cavity 231 and by outlet adapter 240 sealed to valve body 212 at the opposite end or discharge end of valve cavity 231. Valve body 212 has side fluid inlet 239 which is in communication with valve cavity 231. Valve stem seal assembly 246 is mounted within seal cage 245, abutting tightly against valve body 212, and is adjacent actuator adapter 236, as shown in FIG. 7. Seal cage 245, valve stem seal assembly 246 and actuator adapter 236 each have a central through hole to accommodate valve stem 230. Stem anchor 237 is mounted within actuator adapter 236 and is free to slide within the cavity of actuator adapter 236 in which stem anchor 237 is mounted. One end of stem anchor 237 is connected to piston rod 235 and the opposite end of stem anchor 237 is connected to valve stem 230 with stem anchor screw 238. Stem anchor 237 has a central through hole through which valve stem 230 is positioned. It is apparent that set screw 243 can be used to secure stem anchor 237 with respect to valve stem 230.

According to the embodiment shown in FIG. 7, valve poppet 215 is generally cylindrical in shape and its base portion or downstream end has a larger diameter than its extension portion or upstream end. It is apparent that between the embodiment of FIG. 1 and the embodiment of FIG. 7, the upstream and downstream roles are reversed with respect to the base portion and the extension portion of valve poppet 215. The upstream end engages with a downstream end of valve stem 230. The smaller upstream end of valve poppet 215 has a groove that accommodates retainer ring 214 which is used to retain seal disk 218 with or without backup disk 220 and/;or closure spring 222. The upstream end of closure spring 222 preferably abuts a downstream side of retainer ring 214 and a downstream end of closure spring 222 preferably abuts an upstream side of backup disk 220, or if backup disk 220 is not used, an upstream side of seal disk 218. Seal disk 218 abuts a shoulder portion of valve poppet 215 formed at the transition of its smaller upstream end and its relatively larger downstream end. Seal disk 218 has a slightly larger diameter than the outside diameter of the larger downstream end of valve poppet 215. The larger downstream end of valve poppet 215 is positioned within a cylindrical cavity of outlet adapter 240 and is free to slide within such cylindrical cavity of outlet adapter 240.

The depth of the cylindrical cavity of outlet adapter 240 is the same length as the larger downstream end of valve poppet 215 so that the downstream side of seal disk 218 abuts flush with an upstream face of outlet adapter 240 that is exposed within valve cavity 231. The inside face of outlet adapter 240, at the downstream end of the cylindrical cavity within outlet adapter 240, is very smooth so that seal disk 218 can properly and adequately seal an annular gap between valve poppet 215 and outlet adapter 240, particularly when valve poppet 215 is seated within such cylindrical cavity within outlet adapter 240.

As fluid power is applied to valve actuator 234 to move actuator piston 233 up and down, valve poppet 215 will follow such motion which will result in opening or closing the flow from fluid inlet 239 to fluid outlet 241.

As further shown in FIG. 7, fluid inlet 239 is in communication with fluid outlet 241 when valve poppet 215 is raised in an upstream direction by valve actuator 234. Fluid outlet 241 is not in communication with fluid inlet 239 when valve poppet 215 is forced in a downstream direction, by valve actuator 234, to form a fluid-tight peripheral seal between valve poppet 215 and outlet adapter 240. It is apparent that outlet adapter 240 can be replaced with an intermediate element that is not necessarily an integral part of outlet adapter 240.

Closure spring 222 assures that seal disk 218 seals the annular gap between an external surface of valve poppet 215 and an internal surface, which defines the cylindrical cavity, of outlet adapter 240, when valve poppet 215 is in a seated position. Pressurized fluid within valve cavity 231 further enhances the down stream force exerted against valve poppet 215 and thus the seal between valve poppet 215 and outlet adapter 240. Since valve poppet 215 is well supported at the bottom of the cylindrical cavity within outlet adapter 240, valve poppet 215 can withstand forces from extremely high fluid pressures. Seal disk 218 can be constructed of a wide range of materials, particularly those most desirable for sealing purposes in view of the operating conditions. According to preferred embodiments of this invention, there are no metal-to-metal seals. Thus, it is possible for particulate matter within the fluid to not present a problem with sealing, as long as the particles are not too large. Softer materials for seal disk 218 will deform around the particles and thus still form a fluid-tight seal.

Since valve poppet 215 is directly connected to actuator piston 233, springs are preferred to close instant on-off valve 210 and to limit the fluid pressures at a lower value so as to not exert too much stress on valve stem 230, during valve closure; otherwise, the relatively slim valve stem 230 may fracture.

Figure 8:
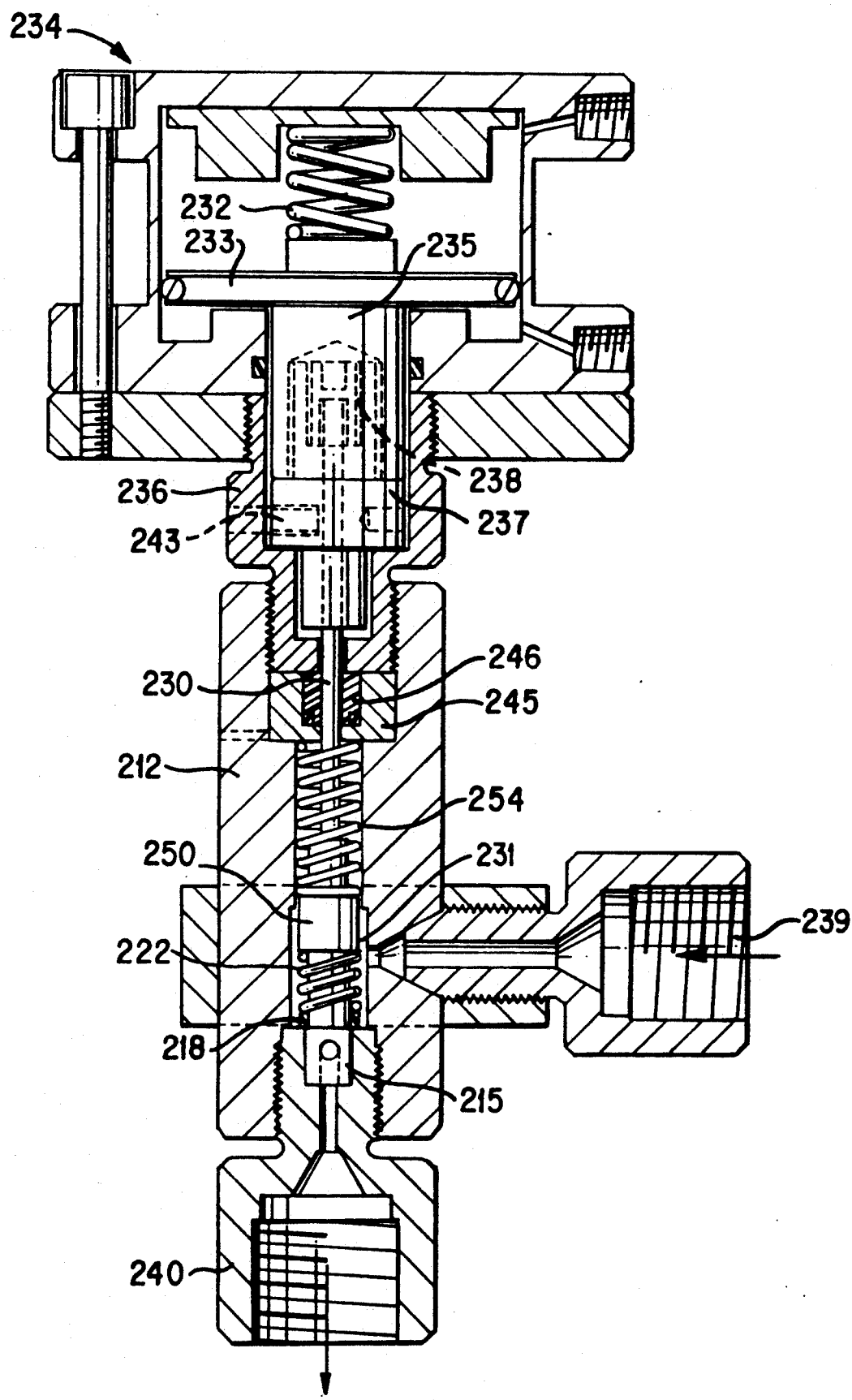
FIG. 8 is a partial cross-sectional view of a high-pressure instant on-off valve, according to another preferred embodiment of this invention, having a pneumatic or hydraulic valve actuator and a valve stem coupler assembly that isolates the forces of the valve actuator from the valve poppet.

FIG. 8 shows another preferred embodiment of instant on-off valve 210 which is capable of handling extremely high fluid pressures as well as difficult-to-handle fluids, such as slurries that contain particulate matter. Instant on-off valve 210 of FIG. 8 is quite similar to instant on-off valve 210 of FIG. 7, except that valve stem 230 is isolated from valve poppet 215 by a stem coupler assembly so that the forces created by valve actuator 234 are not transmitted directly to valve poppet 215. The enlarged view of FIG. 9 better illustrates details of the stem coupler assembly.

Figure 9:
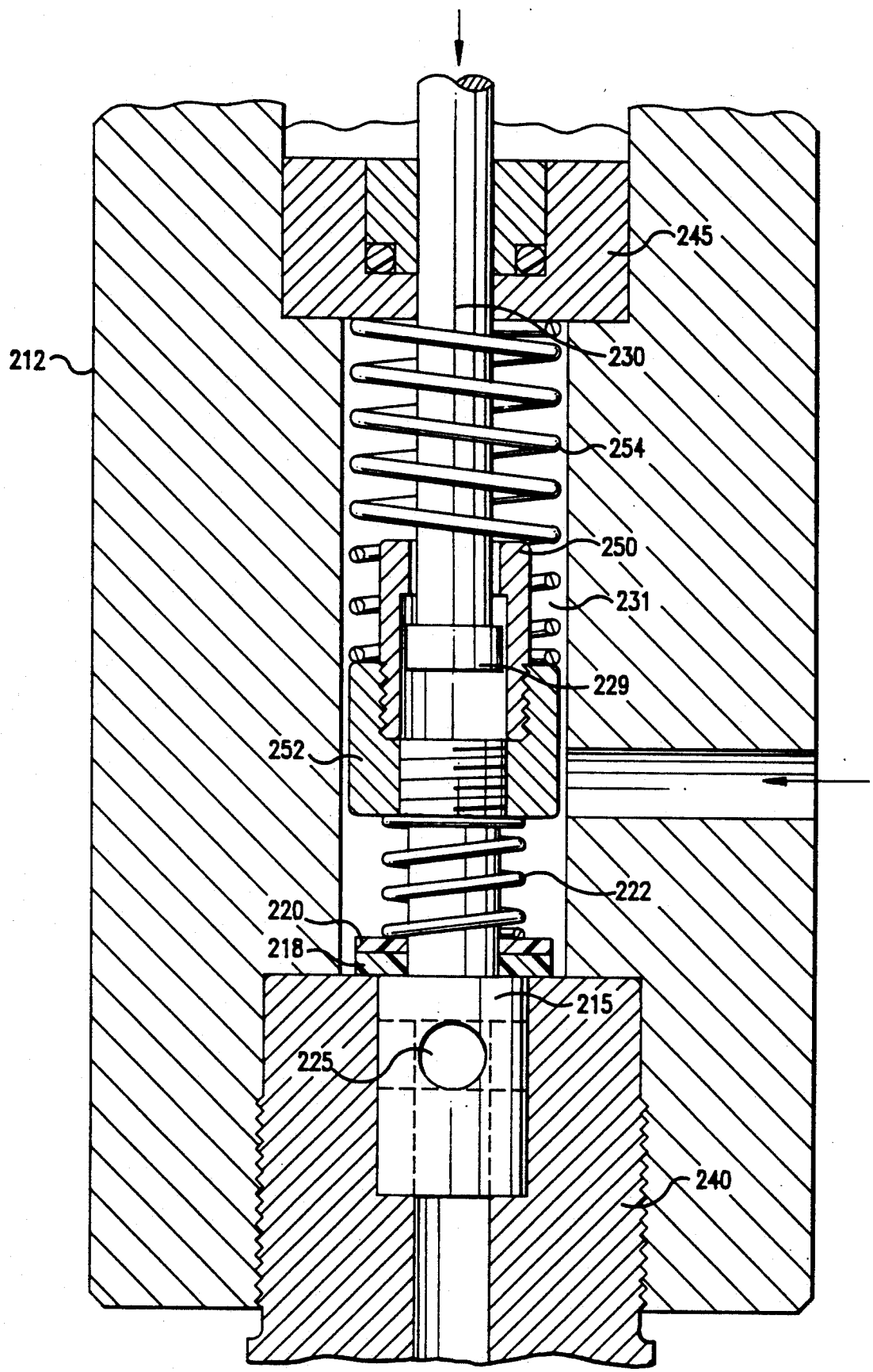
FIG. 9 is an enlarged partial cross-sectional view of yet another preferred embodiment of a high-pressure instant on-off valve showing a preferred arrangement of a valve stem, a stem spring, a stem coupler, a coupler adapter and a valve poppet assembly, with the valve in a closed position.

FIG. 9 shows instant on-off valve 210 in a closed position. As shown in FIG. 8, actuator piston 233 is forced in a downstream direction by cushion spring 232 or by pressurized fluid within the pressure chamber of valve actuator 234. As shown in FIG. 9, valve stem 230 is in its lowest or most downstream position. According to one preferred embodiment of this invention, valve stem 230 has a cylindrical stem shoulder 229, at the downstream end of valve stem 230, which is positioned and free to slide within stem coupler 250 through a central through hole within stem coupler 250. Stem coupler 250 is preferably cylindrical in shape but it is apparent that stem coupler 250 can have any other suitable shape that results in similar movement. Stem coupler 250 is connected to stem coupler adapter 252 by a threaded connection as shown in FIG. 9, or by any other suitable connecting means known to those skilled in art. Stem coupler adapter 252 has a central threaded through hole in which the smaller upstream end of valve poppet 215 is engaged. The larger downstream end of valve poppet 215 preferably has one or more fluid outlet holes 225.

As shown in FIG. 9, stem spring 254 is mounted around valve stem 230 and stem coupler 250. An upstream end of stem spring 254 abuts a downstream face of seal cage 245, which is exposed to valve cavity 231, and the opposite downstream end of stem spring 254 abuts stem coupler adapter 252, so as to exert a constant force in a downstream direction which is turn forces valve poppet 215 in a downstream direction. Seal closure spring 222 is mounted about the smaller upstream end of valve poppet 215, as shown in FIG. 9.

Seal disk 218, with or without backup disk 220, is positioned around the smaller upstream end of valve poppet 215. An upstream end of seal closure spring 222 abuts stem coupler adapter 252 and the opposite downstream end of seal closure spring 222 abuts seal disk 218, or backup disk 220 if it is used.

The outside diameter of seal disk 218 is slightly larger than the outside diameter of the larger downstream end of valve poppet 215. Thus, seal disk 218 will cover the annular gap around the larger downstream end of valve poppet 215 when it is seated within the cylindrical cavity of outlet adapter 240. Seal closure spring 222 assures intimate contact between seal disk 218 and the other contact surfaces, such as the shoulder of valve poppet 215 and the sealing face of outlet adapter 240. The pressurized fluid within valve cavity 231 creates forces against seal disk 218, and backup disk 220 if used, which further enhance the seal between valve poppet 215 and outlet adapter 240.

Still referring to FIG. 9, stem coupler 250 has an internal bore which is considerably larger in diameter than the outside diameter of stem shoulder 229. The entire combination of valve stem 230, the stem coupler assembly, and valve poppet 215 is designed and constructed in such a way that valve stem 230 does not touch stem coupler adapter 252 during operation of instant on-off valve 210. Thus, forces applied for closing instant on-off valve 210 are not transmitted from actuator piston 233 to valve poppet 215 through valve stem 230. Valve poppet 215 is seated by fluidic actions and such seating is assisted by stem spring 254, to absorb the initial impact forces.

Figure 10:
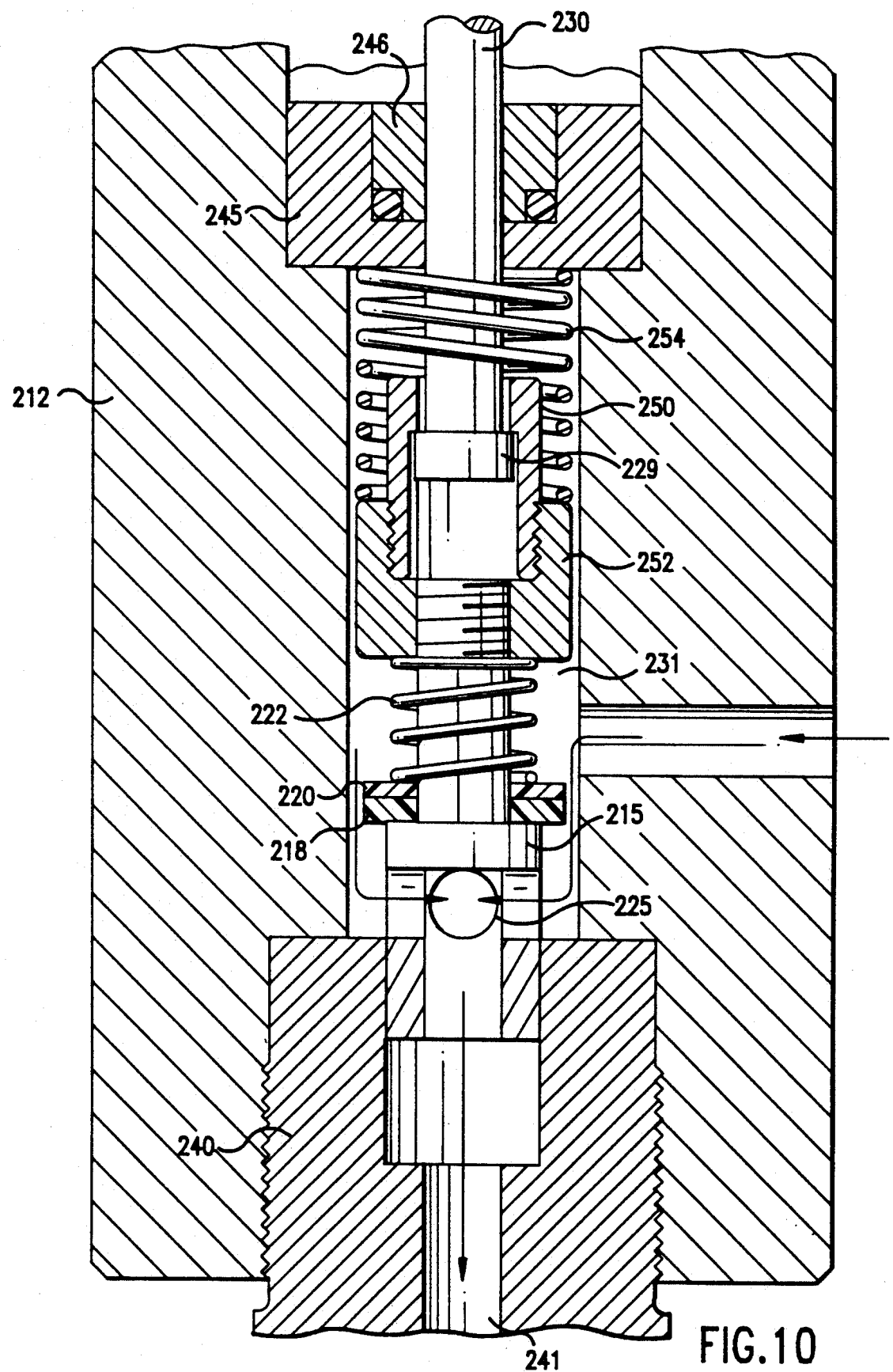
FIG. 10 is an enlarged partial cross-sectional view of the high-pressure instant on-off valve shown in FIG. 9, but in an open position.

FIG. 10 shows instant on-off valve 210 in an open position. As indicated by the inlet arrows, fluid flows into valve cavity 231, through fluid outlet holes 225, and then through fluid outlet 241.

Figure 11:
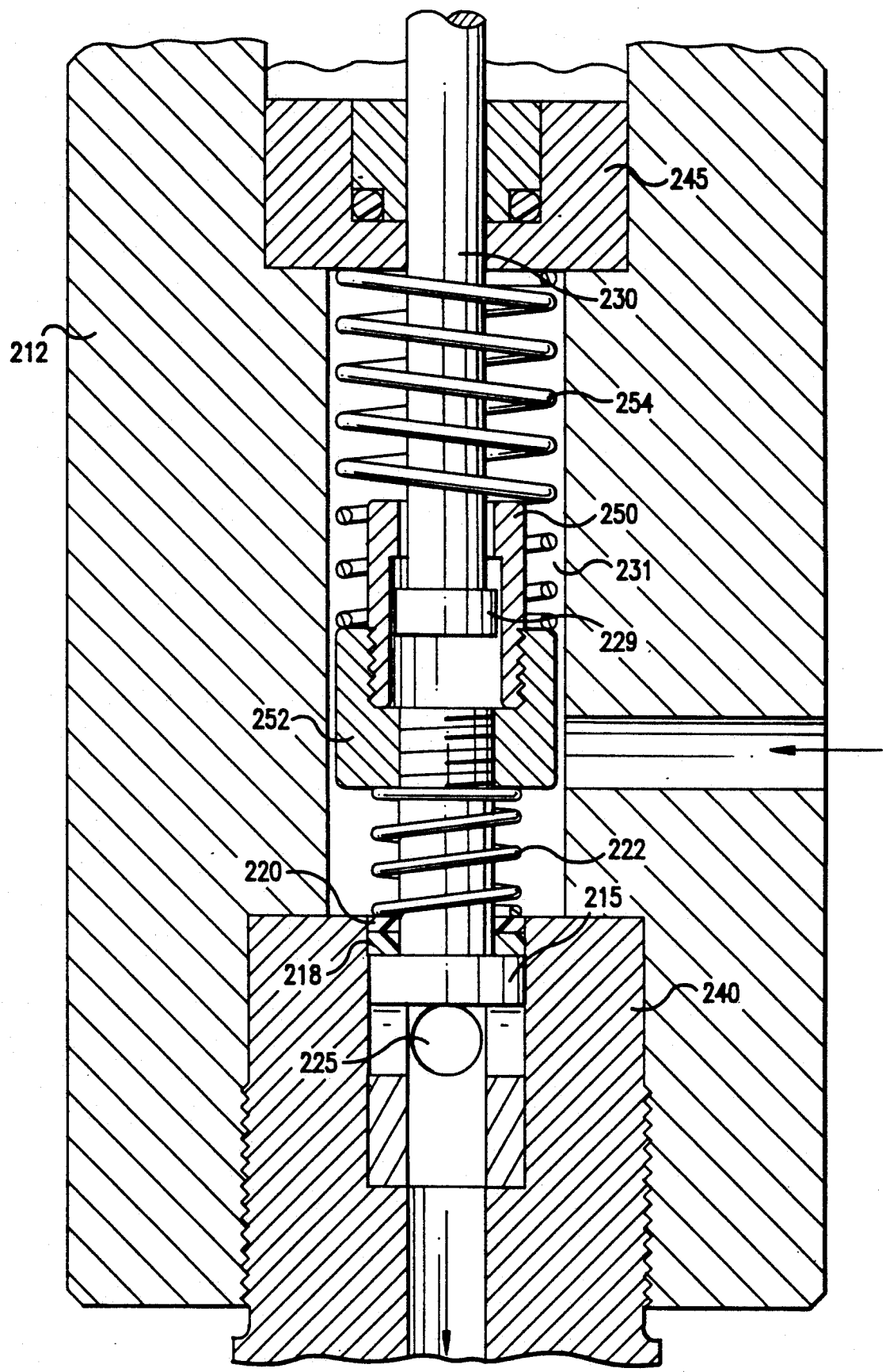
FIG. 11 is an enlarged partial cross-sectional view of another preferred embodiment of a high-pressure instant on-off valve, similar to the embodiment shown in FIG. 9, except for another preferred arrangement of a backup disk and a seal disk.

Referring to FIG. 11, in order to open on-off valve 210, compressed air or hydraulic fluid is introduced into the chamber of valve actuator 234, which is shown in FIGS. 7 and 8, to raise actuator piston 233, which in turn pulls valve stem 215 in an upstream direction. The shoulder of valve stem 230 engages stem coupler 250 and thus lifts stem coupler 250 in an upstream direction, which in turn lifts valve poppet 215 in an upstream direction from within the cylindrical cavity of outlet adapter 240.

The total travel distance of actuator piston 233 is designed to cooperate with valve poppet 215 to lift valve poppet 215 only far enough to expose fluid outlet hole or holes 225 to valve cavity 231 and to not lift valve poppet 215 so far that it is completely removed from the cylindrical cavity within outlet adapter 240.

Fluid within valve cavity 231 can then flow through each fluid outlet hole 225 of valve poppet 215 and thus eventually through fluid outlet 241. When instant on-off valve 210 is in an open position, stem spring 254 is compressed and thus pushes valve poppet 215 in a downstream direction. When the function of valve actuator 234 is reversed, valve stem 230 and thus stem coupler 250, stem coupler adapter 252 and valve poppet 215 will simultaneously move in a downstream direction. Thus, valve poppet 215 seats itself within the cylindrical cavity of outlet adapter 240 and thus closes the communication between fluid inlet 239 and fluid outlet 241.

Instant on-off valve 210 of this invention has unique advantages over conventional instant on-off valves. The valve stem coupler assembly of this invention allows the separation of valve stem 230 from valve poppet 215 and yet allows such elements to advantageously function together. The diameter of valve stem 230 and the diameter of valve poppet 215 can be designed to be the same or different such that the fluid induced forces acting against valve stem 230 can be greater than, equal to or less than the forces pushing seal disk 218 and valve poppet 215 in a downstream direction. Thus, the force requirement for valve actuator 234 can be more accurately determined.

Instant on-off valve 210 of this invention can be designed and constructed to operate as a normally-open or a normally-closed valve by changing the fluid-induced force relationship. By employing valve poppet 215 of this invention, the pressure capabilities of instant on-off valve 210 are drastically increased. Problems associated with bending the valve stem which are common to conventional valves operating at relatively high pressures are not problems with the instant on-off valve according to this invention. Seal disk 218 and closure spring 222 of this invention are arranged to provide a positive and leak-proof seal, even at extremely high pressures. By using softer materials for seal disk 218, or composite materials for seal disk 218, fluids containing relatively hard particulate matter can be handled by instant on-off valve 210 of this invention, even at relatively high pressures. Instant on-off valve 210 according to this invention is extremely reliable.

Figure 12:
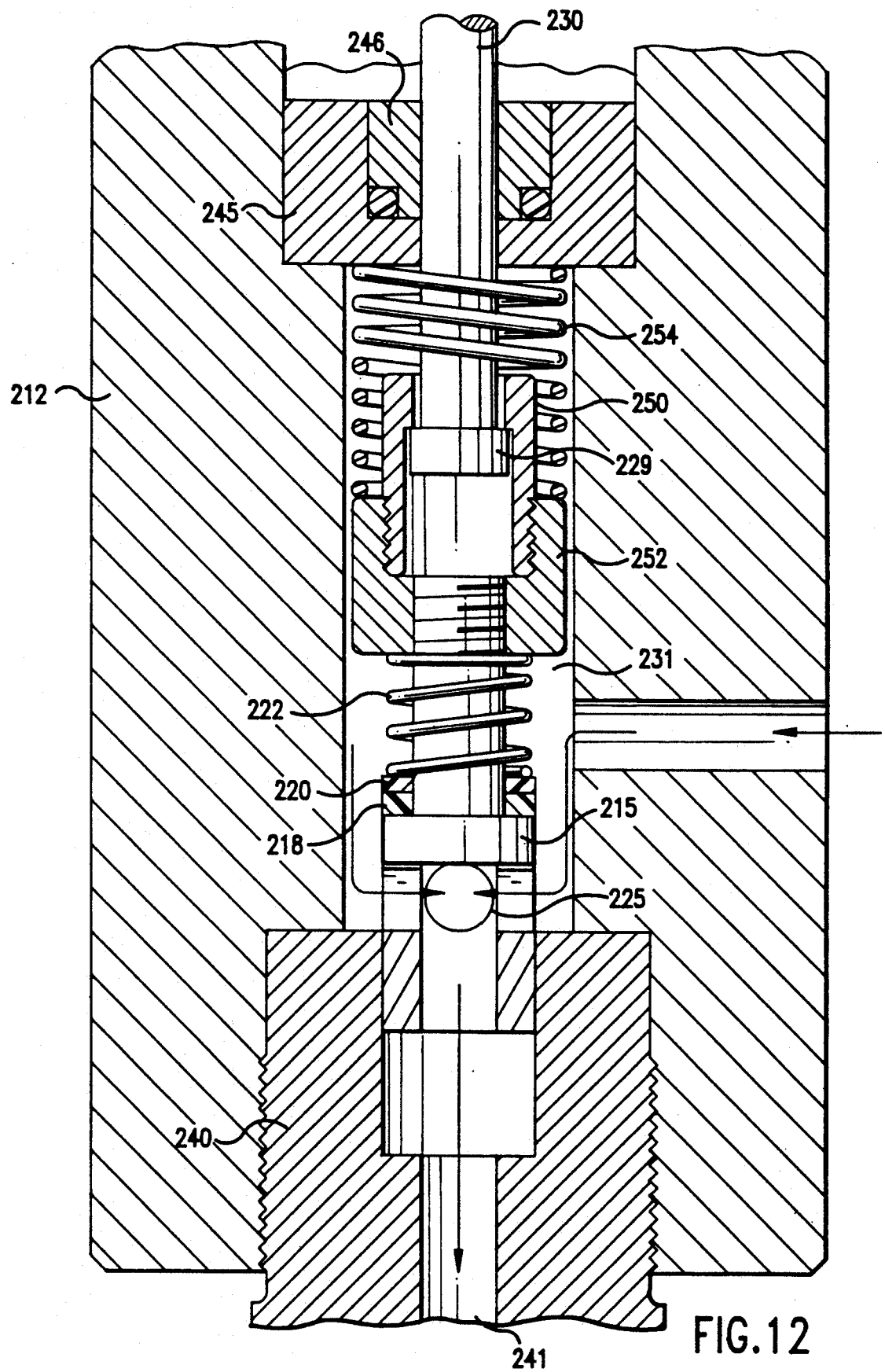
FIG. 12 is an enlarged partial cross-sectional view of the high-pressure instant on-off valve shown in FIG. 11.

FIG. 12 shows instant on-off valve 210 in an open position. As indicated by the inlet arrows, fluid flows into valve cavity 231, though fluid outlet holes 225, and then through fluid outlet 241.

Figure 13:
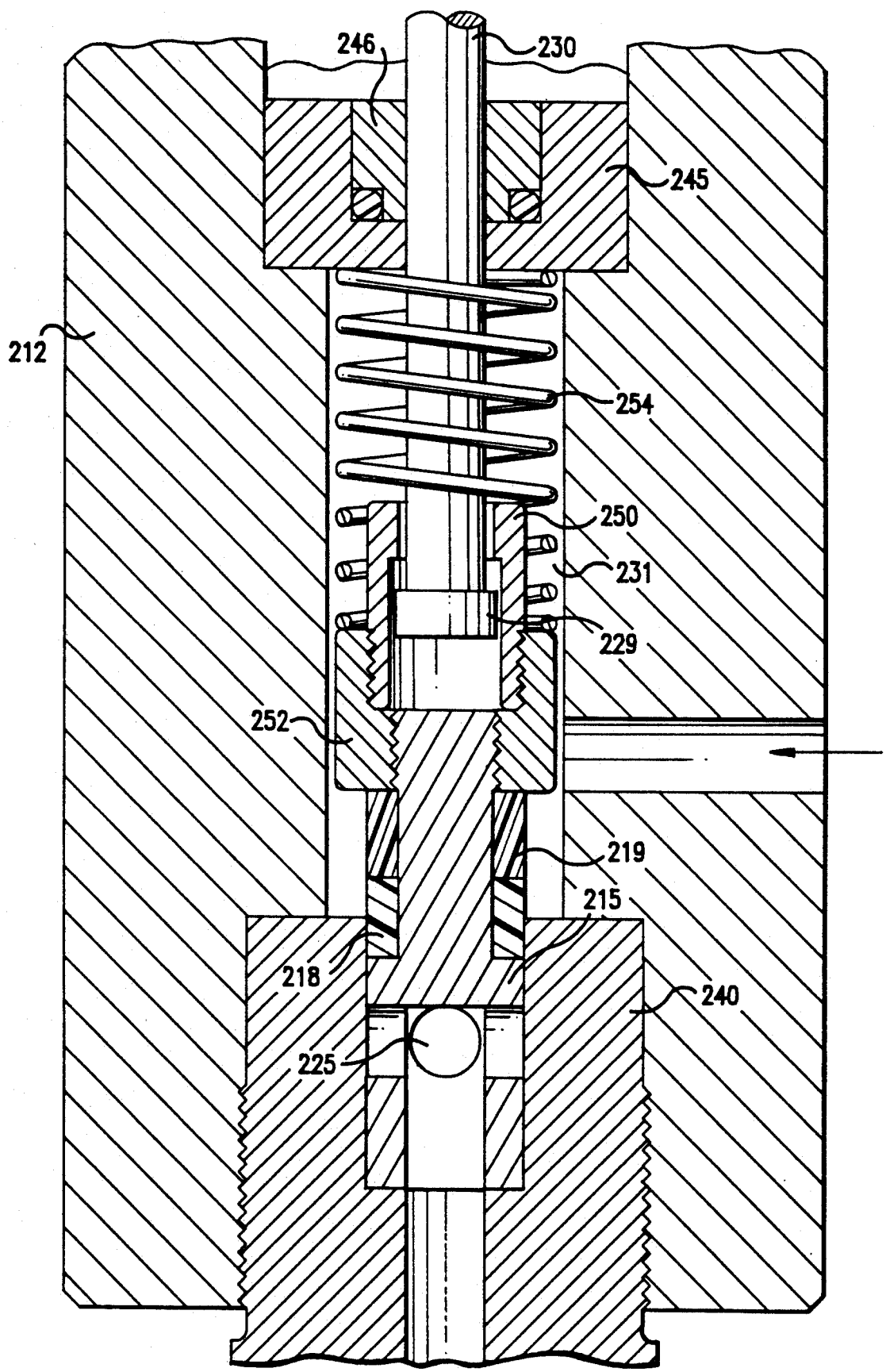
FIG. 13 is an enlarged partial cross-sectional view of still another preferred embodiment of a high-pressure instant on-off valve, shown in a closed position, similar to the embodiments shown in FIGS. 11 and 12, except for yet another preferred arrangement of a backup disk and a seal disk.

FIG. 13 shows an enlarged partial cross-sectional view of yet another preferred embodiment of instant on-off valve 210. In such preferred embodiment, spacer disk 219 is positioned between stem coupler adapter 252 and seal disk 218. In FIG. 13, instant on-off valve 210 is shown in a closed position.

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

I claim:

1. A check valve comprising:
a valve housing having an outlet fluid passage and a housing valve cavity, said outlet fluid passage in communication with said housing valve cavity, a valve body having an inlet fluid passage and a body cavity, said inlet fluid passage in communication with said body cavity, said valve body sealably secured to said valve housing;
a valve poppet, said valve poppet having a base portion, an extension portion, an da shoulder formed at a transition from said base portion to said extension portion, said base portion of said valve poppet slidably mounted within said body cavity with a close annular tolerance between said valve poppet and said valve body, in a closed position of the check valve a bottom surface of said base portion of said valve poppet abutting a supporting surface of said valve body which partially defines said body cavity, said valve poppet having means for forming communication between said inlet fluid passage and said housing valve cavity in an open position of the check valve;
a seal disk having a seal disk through hole, said seal disk positioned within said housing valve cavity, said seal disk abutting said poppet shoulder portion, said extension portion positioned within said seal disk through hole; and
bias means for normally urging said valve poppet into said closed position of the check valve.

2. A check valve according to claim 1 further comprising: a backup disk having a backup disk through hole, said backup disk positioned within said housing valve cavity, said backup disk abutting said seal disk, and said extension portion positioned within said backup disk through hole.

3. A check valve according to claim 1 further comprising a seal tightly mounted between said valve body and said valve housing.

4. A check valve according to claim 1 wherein a height of said body portion of said valve poppet is equal to a depth of said body cavity.

5. A check valve according to claim 1 wherein said bias means comprises a closure spring mounted between said seal disk and a housing shoulder of said valve housing.

6. A check valve according to claim 5 wherein said closure spring is a coil spring and is mounted about at least a portion of said extension portion of said valve poppet.

7. A check valve according to claim 1 further comprising a seal gasket tightly mounted between said seal disk and said valve body.

8. A check valve according to claim 1 wherein said seal disk has at least flattened edge.

9. A check valve according to claim 1 wherein said means for preventing and forming communication further comprise: said valve poppet having a central cavity and a side wall of said valve poppet having a poppet through hole in communication with said central cavity.

10. A check valve according to claim 1 wherein at least a portion of said base portion has a base cross-sectional area less than a shoulder cross-sectional area of said shoulder.

11. A check valve according to claim 10 wherein at said base cross-sectional area said base portion has a cutout section positioned along at least a portion of a periphery of said base portion.

12. A check valve according to claim 1 further comprising: actuator means for axially displacing said valve poppet by sliding said valve poppet within said body cavity, and said extension portion being attached to said actuator means.

13. A check valve according to claim 12 wherein a stem coupler adapter is attached to said extension portion and said actuator means further comprises: a stem coupler attached to said stem coupler adapter forming a stem coupler cavity, said stem coupler and said stem coupler adapter mounted within said valve cavity, said stem coupler having a coupler through hole, a valve stem extending through said stem coupler through hole, said valve stem having a stem shoulder positioned within said stem coupler cavity, and said bias means comprising a stem spring mounted within said valve cavity and urging said stem coupler and said stem coupler adapter into said closed position.

14. A check valve according to claim 13 wherein said actuator means further comprise: a seal cage mounted within said valve body, said seal cage having a seal cage cavity and a seal cage through hole through which said valve stem extends, a valve stem seal assembly mounted within said seal cage cavity, and said valve stem seal assembly having a seal assembly through hole through which said valve stem extends.

15. A check valve according to claim 13 further comprising: a retainer ring, said extension portion having a groove, said retainer ring positioned within said groove, and a closure spring positioned between said retainer ring and said seal disk for urging said seal disk toward said sealing surface.

16. A check valve according to claim 1 further comprising:

said valve body secured to an equipment body, said equipment body having an equipment cavity, said valve body having a secondary inlet fluid passage and a secondary body cavity, said secondary inlet fluid passage in communication with said secondary body cavity;

a secondary valve poppet slidably mounted within said secondary body cavity, said secondary valve poppet having a secondary poppet shoulder portion and a secondary extension portion, said secondary valve poppet having secondary means for preventing communication between said secondary fluid inlet passage and said equipment cavity in a secondary closed position of the secondary valve poppet and for forming communication between said secondary inlet fluid passage and said equipment cavity in a secondary open position of said secondary valve poppet;

a secondary seal disk having a secondary seal disk through hole, said secondary seal disk positioned within said equipment cavity, said secondary seal disk abutting said secondary poppet shoulder portion, said secondary extension portion positioned within said secondary seal disk through hole; and secondary bias means for normally urging said secondary valve poppet into said secondary closed position, and in said secondary closed position said secondary valve poppet abutting a secondary sealing surface of said valve body.

17. A check valve according to claim 16 wherein said secondary inlet fluid passage is in communication with a valve housing inlet passage of said valve housing.

18. A check valve according to claim 16 wherein said secondary seal disk has a seal disk through hole in communication with said inlet fluid passage and said equipment cavity.

19. A check valve according to claim 16 wherein an annular space is formed between said valve body and said valve housing, and said annular space is in communication with said secondary inlet fluid passage.

20. A check valve according to claim 16 wherein said secondary means for preventing and forming communication further comprise: said secondary valve poppet having a central cavity and a side wall of said secondary valve poppet having a poppet through hole in communication with said central cavity.

* * * * *